(12) United States Patent
Kim et al.

(10) Patent No.: US 10,640,840 B2
(45) Date of Patent: May 5, 2020

(54) HOT PRESS FORMED ARTICLE HAVING EXCELLENT DELAMINATION RESISTANCE AND METHOD FOR MANUFACTURING THE SAME

(71) Applicant: POSCO, Pohang-si (KR)

(72) Inventors: Heung-Yun Kim, Gwangyang-si (KR); Il-Ryoung Sohn, Gwangyang-si (KR); Dae-Chul Bae, Pohang-si (KR)

(73) Assignee: POSCO, Pohang-si (KR)

( * ) Notice: Subject to any disclaimer, the term of this patent is extended or adjusted under 35 U.S.C. 154(b) by 348 days.

(21) Appl. No.: 15/250,022

(22) Filed: Aug. 29, 2016

(65) Prior Publication Data

US 2016/0376679 A1    Dec. 29, 2016

Related U.S. Application Data

(63) Continuation of application No. PCT/KR2015/004327, filed on Apr. 29, 2015.

(30) Foreign Application Priority Data

Dec. 24, 2014    (KR) .................. 10-2014-0189098

(51) Int. Cl.
   *B32B 15/01*    (2006.01)
   *C21D 9/46*    (2006.01)
   (Continued)

(52) U.S. Cl.
   CPC ............. *C21D 9/46* (2013.01); *B32B 15/012* (2013.01); *C21D 8/0226* (2013.01);
   (Continued)

(58) Field of Classification Search
   None
   See application file for complete search history.

(56) References Cited

U.S. PATENT DOCUMENTS 6,296,805 B1    10/2001    Laurent et al.
6,309,761 B1    10/2001    Guesdon et al.
(Continued)

FOREIGN PATENT DOCUMENTS

CN    1531604    9/2004
CN    102300707    12/2011
(Continued)

OTHER PUBLICATIONS

International Search Report—PCT/KR2015/004327 dated Sep. 8, 2015.

(Continued)

*Primary Examiner* — Adam Krupicka
(74) *Attorney, Agent, or Firm* — Cantor Colburn LLP (57) ABSTRACT

An HPF molding member having a melted aluminum plating layer formed on the surface of a base steel sheet and excellent delamination resistance. The base steel sheet comprises: 0.18-0.25% by weight of C; 0.1-1.0% by weight of Si; 0.9-1.5% by weight of Mn; 0.03% by weight or less of P; 0.01% by weight or less of S; 0.01-0.05% by weight of Al; 0.05-0.5% by weight of Cr; 0.01-0.05% by weight of Ti; 0.001-0.005% by weight of B; 0.009% by weight or less of N; and the balance Fe and other impurities. The plating layer consists of a soft diffusion layer and a hard alloy layer, the hard alloy layer having a tau layer irregularly and non-continuously dispersed and distributed on the inside thereof at 10% or more of the entire area fraction. The difference in hardness between the alloy layer and the diffusion layer is 400 (Hv) or less.

19 Claims, 2 Drawing Sheets

(51) Int. Cl.
| | |
|---|---|
| C23C 2/12 | (2006.01) |
| C23C 2/28 | (2006.01) |
| C23C 30/00 | (2006.01) |
| C23C 2/02 | (2006.01) |
| C22C 38/28 | (2006.01) |
| C21D 8/02 | (2006.01) |
| C22C 21/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/32 | (2006.01) |
| C22F 1/043 | (2006.01) |
| C23C 2/40 | (2006.01) |

(52) U.S. Cl.
CPC ............ *C21D 8/0236* (2013.01); *C22C 21/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C22F 1/043* (2013.01); *C23C 2/02* (2013.01); *C23C 2/12* (2013.01); *C23C 2/28* (2013.01); *C23C 2/285* (2013.01); *C23C 2/40* (2013.01); *C23C 30/00* (2013.01)

(56) References Cited

U.S. PATENT DOCUMENTS

| | | | |
|---|---|---|---|
| 6,815,087 | B2 | 11/2004 | Takagi et al. |
| 8,986,849 | B2 | 3/2015 | Maki et al. |
| 9,464,345 | B2 | 10/2016 | Maki et al. |
| 2006/0121305 | A1* | 6/2006 | Yoshikawa ............... C23C 2/26 428/629 |
| 2006/0185774 | A1* | 8/2006 | Nishibata ................. C21D 1/02 148/653 |
| 2012/0085467 | A1 | 4/2012 | Thirion et al. |
| 2014/0030544 | A1 | 1/2014 | Maki et al. |

FOREIGN PATENT DOCUMENTS

| | | |
|---|---|---|
| CN | 102851629 | 1/2013 |
| CN | 102971444 | 3/2013 |
| CN | 103492605 | 1/2014 |
| EP | 2584059 | 4/2013 |
| EP | 2695963 | 2/2014 |
| JP | 2000038640 | 2/2000 |
| JP | 2000239819 | 9/2000 |
| JP | 2004043887 | 2/2004 |
| JP | 2005097725 | 4/2005 |
| JP | 2006037130 | 2/2006 |
| JP | 2008255391 | 10/2008 |
| JP | 2010018856 | 1/2010 |
| JP | 2010018860 | 1/2010 |
| KR | 1020070087240 | 8/2007 |
| KR | 1020130132623 | 12/2013 |
| WO | 02103073 | 12/2002 |
| WO | 2012137687 | 10/2012 |

OTHER PUBLICATIONS

22MnB5 Boronalloyed quenched and tempered steel, Salzgitter Flachstahl, 2014, pp. 1-3.

Jenner, et al., Evolution of Phases and Microstructure during Heat Treatment of Aluminized Low Carbon Steel, Materials and Science Technology, 2008, pp. 1722-1732.

PCT Third Party Observation—PCT/KR2015/004327 dated May 2, 2017, citing Jenner, et al., Salzgitter Flachstahl and EP2695963.

European Search Report—European Application No. 15873408.7 dated Sep. 1, 2017, citing EP 2 695 963, Jenner, et al. and EP 2 584 059.

Jenner, et al., Evolution of Phases, Microstructure, and Surface Roughness during Heat Treatment of Aluminized Low Carbon Steel, Metallurgical and Materials Transactions A, pp. 1554-1563, vol. 41, 2010.

* cited by examiner

HOT PRESS FORMED ARTICLE HAVING EXCELLENT DELAMINATION RESISTANCE AND METHOD FOR MANUFACTURING THE SAME

CROSS-REFERENCE TO RELATED APPLICATION

This application is a continuation of PCT Patent Application No. PCT/KR2015/004327 filed on Apr. 29, 2015, which claims priority to and the benefit of Korean Patent Application No. 10-2014-0189098 filed on Dec. 24, 2014, and the entire disclosures of which are incorporated herein by reference.

TECHNICAL FIELD

The present invention relates to a method for manufacturing a hot press formed (HPF) article having excellent delamination resistance, and more particularly, to a hot press formed (HPF) article having excellent delamination resistance through control of a hardness ratio between an alloyed layer and a soft diffusion layer formed when alloy heat treating a hot dip aluminum plated steel sheet having a hot dip aluminum plating layer on the surface to a fixed value, and a method for manufacturing the same.

BACKGROUND ART

A steel sheet for aluminum plating HPF (Hot Press Forming) is commonly manufactured by immersing a steel sheet having high hardenability in a plating bath with Al as a base, and a plated steel sheet having an Al plating layer on the surface is subsequently heat treated to be widely used in manufacturing articles for automobiles having a complex shape and strength of 1300 MPa or greater.

However, during a HPF heat treatment process, the plating layer may have a structure having an alloyed layer including an intermetallic compound such as FeAl, $Fe_2Al_5$ or the like as an upper layer, and a diffusion layer formed with 80% by weight to 95% by weight of Fe (hereinafter, compositions of steel components are all provided in % by weight) as a lower layer. However, the alloyed layer on the upper side in the plating layer may be brittle as compared to the diffusion layer, and is removed from the plating layer during press forming and adsorbed on a pressing surface, which may be disadvantageous, making continuous press forming difficult.

In detail, in a hot press formed (HPF) article prepared by forming a hot dip aluminum plating layer on a substrate steel sheet and high temperature forming thereafter, the plating layer is formed to have a soft diffusion layer and a hard alloy layer, and a breakage may occur at an interface of the diffusion layer and the alloy layer during high temperature hot processing. Then the broken plating layer may accumulate on a mold in fine powder form, and in some cases, may adhere to the mold and cause various issues such as size changes in the hot press formed (HPF) article, surface dent occurrence, mold modification and cutting work, and additional costs may be incurred.

When such problems occur, companies receiving and hot processing the material bear extra costs, and automobile companies may also face significant losses since production delays may inevitably occur. Consequently, there has been demand for the development of hot press formed (HPF) articles having excellent press formability in which problems described above have been overcome.

SUMMARY OF THE INVENTION

The present invention has been made in view of the above, and an object of the present invention is to provide a formed article for HPF having excellent delamination resistance by managing a difference in hardnesses between an alloyed layer and a soft layer forming a hot dip aluminum alloy plating layer within a fixed value range.

Another object of the present invention is to provide a method for manufacturing the hot press formed (HPF) article.

However, problems that the present invention is intended to solve are not limited to the problems described above, and other problems that have not been mentioned may be clearly understood to those skilled in the art from the descriptions made below.

In view of the above, an embodiment of the present invention provides a hot press formed (HPF) article having excellent delamination resistance, a hot dip aluminum plating layer being formed on a surface of a substrate steel sheet, wherein the substrate steel sheet includes, in % by weight, C: 0.18% to 0.25%, Si: 0.1% to 1.0%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005, N: 0.009% or less, and a remainder of Fe and other impurities;

the plating layer is formed to have a soft diffusion layer and a hard alloy layer; and a tau layer is irregularly and discontinuously dispersed and distributed inside the alloy layer in an amount of 10% or greater based on the total area fraction so that a difference in hardnesses between the alloy layer and the diffusion layer may be 400 (Hv) or less.

The substrate steel sheet may be a cold rolled steel sheet or a hot rolled steel sheet.

In the present invention, the tau phase is preferably present in a range of 10% by area to 20% by area inside the alloy layer.

The tau phase preferably has an aspect ratio in a range of 1 to 4.

The tau phase having a size of 5 μm or less preferably occupies an area of 50% or greater with respect to the total tau phase fraction.

The substrate steel sheet preferably further includes Mo+W in an amount of 0.001% to 0.5%.

In addition, the substrate steel sheet preferably further includes a sum of one or more types of Nb, Zr or V in a range of 0.001% to 0.4%.

Further, the substrate steel sheet preferably further includes Cu+Ni in a range of 0.005% to 2.0%.

Moreover, the substrate steel sheet preferably further includes one or more types of Sb, Sn or Bi in an amount of 0.03% or less.

Another embodiment of the present invention relates to a method for manufacturing a hot press formed (HPF) article having excellent delamination resistance, the method including preparing a steel sheet having steel components as above;

hot dip aluminum plating the steel sheet by, after heating the steel sheet to a temperature of 550° C. to 850° C., immersing the steel sheet in a hot dip aluminum plating bath maintained at a temperature of 640° C. to 680° C. and composed of, in % by weight, Si: 7% to 13%, Fe: less than 3%, and the remainder of Al and other unavoidable impurities;

skin pass milling (SPM) the hot dip galvanized steel sheet with an elongation of 0.5% to 3% after cooling the hot dip galvanized steel sheet;

alloying a hot dip aluminum plating layer on a surface of the hot dip aluminum plated steel sheet by heating the hot dip aluminum plated steel sheet to a temperature of 850° C. to 950° C. and maintaining the temperature for a certain period of time; and manufacturing a hot press formed (HPF) product by rapidly cooling the alloyed hot dip aluminum plated steel sheet to a temperature of 300° C. or lower while hot press forming the alloyed hot dip aluminum plated steel sheet.

The alloyed hot dip aluminum plating layer is formed to have a soft diffusion layer and a hard alloy layer; and preferably, a tau phases is irregularly and discontinuously dispersed and distributed inside the alloy layer in an amount of 10% or greater, based on the total area fraction.

The substrate steel sheet may be a cold rolled steel sheet or a hot rolled steel sheet.

The tau phase is preferably present in a range of 10% by area to 20% by area inside the alloy layer.

The tau phase preferably has an aspect ratio in a range of 1 to 4.

The tau phase having a size of 5 μm or less preferably occupies an area of 50% or greater with respect to the total tau phase fraction.

Another embodiment of the present invention relates to a method for manufacturing a hot press formed (HPF) article having excellent delamination resistance, the method including skin pass milling (SPM) a hot dip aluminum plated steel sheet with an elongation of 0.5% to 3% on which a hot dip aluminum plating layer is formed;

alloying a hot dip aluminum plating layer on a surface of the hot dip aluminum plated steel sheet by heating the hot dip aluminum plated steel sheet to a temperature of 850° C. to 950° C. and maintaining the temperature for a certain period of time; and manufacturing a hot press formed (HPF) product by rapidly cooling the alloyed hot dip aluminum plated steel sheet to a temperature of 300° C. or lower while hot press forming the alloyed hot dip aluminum plated steel sheet.

The alloyed hot dip aluminum plating layer is formed to have a soft diffusion layer and a hard alloy layer; and preferably, a tau phases is irregularly and discontinuously dispersed and distributed inside the alloy layer in an amount of 10% or greater based on the total area fraction.

The substrate steel sheet may be a cold rolled steel sheet or a hot rolled steel sheet.

The tau phase is preferably present in a range of 10% by area to 20% by area inside the alloy layer.

The tau phase preferably has an aspect ratio in a range of 1 to 4.

The tau phase having a size of 5 μm or less preferably occupies an area of 50% or greater with respect to the total tau phase fraction.

The present invention having a composition as described above is capable of decreasing a difference in hardnesses between an alloy layer and a soft layer by dispersing a soft tau phase into a relatively hard alloy layer, and as a result, a hot press formed (HPF) article having excellent delamination resistance can be effectively provided.

DETAILED DESCRIPTION OF THE INVENTION

Hereinafter, the present invention will be described.

When external pressure is applied to a hot dip aluminum alloy plating layer during high temperature hot processing, stress formed in the plating layer may act on the hard alloy layer and the soft diffusion layer formed in the plating layer during a transfer thereof to a substrate steel sheet. Herein, the inventors of the present invention have discovered from their research results that the hard layer develops and spreads cracks since it does not sufficiently overcome deformation stress, while the soft diffusion layer prevents the spread of cracks by absorbing deformation stress caused by the processing. Further, the inventors of the present invention have taken an interest in a tau phase present in the alloy layer and have repeatedly carried out experiments thereon, and as a result, have identified that a tau phase in the alloy layer is relatively soft and suppresses the spreading of cracks, and delays the cracks from reaching an interface of the diffusion layer and the alloy layer.

Moreover, as a result of studies into methods for reducing powdering during high temperature processing, the inventors of the present invention have identified that the generation of powdering in high temperature processing may be suppressed when a difference in hardnesses between a diffusion layer and an alloy layer is controlled to a certain level or below, and moreover, the difference in hardnesses is influenced by tau phase distribution and the like in the hard layer, and is providing the present invention.

Hereinafter, a hot press formed (HPF) article having excellent delamination resistance of the present invention will be described. The hot press formed (HPF) article of the present invention has a structure on which a hot dip aluminum plating layer is formed on a surface of a substrate steel sheet, and the substrate steel sheet includes, in % by weight, C: 0.18% to 0.25%, Si: 0.1% to 1.0%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005, N: 0.009% or less, and a remainder of Fe and other impurities. Specific steel components and reasons for limitation are as follows.

C: 0.18% to 0.25%

C is an essential element increasing the strength of martensite. When the C content is lower than 0.18%, sufficient strength for securing crashworthiness is difficult to obtain. When the content is greater than 0.25%, impact toughness of a slab may be reduced, and weldability of the hot press formed (HPF) article may be reduced as well. Considering the above, the present invention preferably limits the content of C to 0.18% by weight to 0.25% by weight (hereinafter, simply referred to as %).

Si: 0.1% to 1.0%

Si is effective in material homogenization of steel after hot press forming (HPF), and may contribute to the production of a tau phase in a plating layer by being diffused to the plating layer during HPF heat treatment. When the Si content is lower than 0.1%, sufficient effects in the material homogenization and the diffusion to the plating layer may not be obtained, and when the content is greater than 1.0%, favorable hot dip aluminum plated surface qualities may be difficult to secure due to Si oxides produced on the steel sheet surface during annealing, and therefore, Si is added in an amount of 1.0% or less.

Mn: 0.9% to 1.5%

Like Cr, B and the like, Mn is added to secure the hardenability of steel. When the Mn content is lower than 0.9%, sufficient hardenability is difficult to secure and bainite may resultantly be produced, and as a result, sufficient strength may be difficult to secure. When the content is greater than 1.5%, steel sheet manufacturing costs may be increased and bending properties of the hot press formed (HPF) article may be significantly reduced as well, since Mn is segregated inside the steel. Considering the above, the present invention preferably limits the Mn content to a range of 0.9% to 1.5%.

P: 0.03% or less (not including 0%)

P is an element inhibiting many properties of the hot press formed (HPF) article as a grain boundary segregation element, and is preferably added in as small an amount as possible. When the P content is greater than 0.03%, bending properties, impact properties, weldability and the like of the formed article are degraded, and limiting the upper limit to 0.03% is preferable.

S: 0.01% or less (not including 0%)

S is an element inhibiting bending properties and weldability of the formed article as impurities present in the steel, and is preferably added in as small an amount as possible. When the S content is greater than 0.01%, bending properties, weldability and the like of the formed article may be degraded, and the upper limit is preferably limited to 0.01%.

Al: 0.01% to 0.05%

Al is added for deoxidation in steel manufacturing, which is similar to Si. To realize this goal, Al needs to be added in an amount of 0.01% or greater, however, when the content is greater than 0.05%, a deoxidation effect may be saturated and surface qualities of a plating material may be inferior as well, and the upper limit is preferably limited to 0.05%.

Cr: 0.05% to 0.5%

Like Mn, B and the like, Cr is added to secure the hardenability of steel. When the Cr content is lower than 0.05%, sufficient hardenability is difficult to secure, and when the content is greater than 0.5%, hardenability may be sufficiently secured, however, the hardenability properties may be saturated, and steel manufacturing costs may be increased. Considering the above, the present invention preferably limits the Cr content to a range of 0.05% to 0.5%.

Ti: 0.01% to 0.05%

Ti is added for retaining a solid solution B essential to secure hardenability by bonding with nitrogen remaining as an impurity in the steel to produce TiN. When the Ti content is lower than 0.01%, the effect is difficult to be sufficiently expected, and when the content is greater than 0.05%, the hardenability properties may be saturated, and steel manufacturing costs may be increased as well. Considering the above, the present invention preferably limits the Ti content to a range of 0.01% to 0.05%.

B: 0.001% to 0.005%

Like Mn and Cr, B is added to secure hardenability in the hot press formed (HPF) article. B needs to be added in an amount of 0.001% or greater to realize the above-mentioned goal, and when the content is greater than 0.005%, the hardenability effect is saturated, and a hot rolling property significantly decreases as well. Accordingly, the present invention preferably limits the B content to a range of 0.001% to 0.005%.

N: 0.009% or less

N is present as impurities in the steel, and is preferably added in as small an amount as possible. When the N content is greater than 0.009%, steel surface defects may be caused, and the upper limit is preferably limited to 0.009%.

Next, a substrate steel sheet forming the hot press formed (HPF) article of the present invention may additionally contain the following components.

Mo+W: 0.001% to 0.5%

Mo and W are elements for increasing hardenability and precipitation, and are highly effective in further securing high strength. When the added sum of Mo and W is less than 0.001%, sufficient hardenability and precipitation strengthening effects may not be obtained, and when the sum of Mo and W is greater than 0.5%, the hardenability and precipitation effects may be saturated, and manufacturing costs may be increased as well. Accordingly, the present invention preferably limits the Mo+W content to a range of 0.001% to 0.5%.

Sum of one or more types of Nb, Zr or V: 0.001% to 0.4%

Nb, Zr and V are elements enhancing steel sheet strength, grain refinement and heat treatment properties. When the content of one or more types of Nb, Zr and V is less than 0.001%, the effects as above are difficult to be expected, and when the content is greater than 0.4%, manufacturing costs may be increased excessively. Accordingly, the present invention preferably limits the content of these elements to 0.001% to 0.4%.

Cu+Ni: 0.005% to 2.0%

Cu is an element enhancing strength by producing fine Cu precipitates, and Ni is an element efficient for increasing strength and enhancing heat treatment properties. When the sum of these components is less than 0.005%, target strength may not be sufficiently obtained, and when the content is greater than 2.0%, operability may be poor and manufacturing costs may be increased. Considering the above, the present invention preferably limits Cu+Ni to 0.005% to 2.0%.

One or More Types of Sb, Sn or Bi: 0.03% or Less

Sb, Sn and Bi are grain boundary segregation elements, and may be thickened at an interface of a plating layer and substrate iron when undertaking HPF heating to enhance adhesive strength of the plating layer. By enhancing adhesive strength of the plating layer, Sb, Sn and Bi may contribute to the prevention of plating layer elimination during the hot press forming. Sb, Sn and Bi have similar properties, and therefore, these 3 elements may be mixed and used, and herein, employing the sum of one or more types in an amount of 0.03% or less is preferable. When a sum of these components is greater than 0.03%, there may be concern for degenerating brittleness in substrate iron during hot press forming.

The hot press formed (HPF) article of the present invention has a hot dip aluminum plating layer formed on a surface of a substrate steel sheet having the above-described steel components, and as is commonly known in the art, such a plating layer is formed to have a soft diffusion layer and a hard alloy layer.

First, an alloy plating layer structure of the iron-aluminum alloy plated article is simply described. After hot dip aluminum plating a steel sheet, the result is heat treated to form an alloy plating layer. The alloy plating layer is formed to have a diffusion layer and an alloy layer, and the diffusion layer is present between a substrate steel sheet and the alloy layer. The alloy layer is formed of $Fe_2Al_5$, an intermetallic compound, and a tau phase, and the tau phase is a Fe—Al—Si-based three-membered alloy phase, and is distributed inside the alloy layer. In other words, the alloyed layer is formed including a $Fe_2Al_5$ matrix phase having brittleness and a tau phase (Fe—Al—Si-based alloy phase particle) having soft properties is also formed. In detail, hardness of the diffusion layer is normally a Vicker's hardness (load 1 g)

level of 500, which is relatively soft, and the alloy layer is a $Fe_2Al_5$ intermetallic compound, and is very hard with a Vicker's hardness (load 1 g) level of 900 to 1100. Accordingly, there is a large difference in hardnesses between the diffusion layer and the alloy layer, when a difference in hardnesses increases as above and external force is applied, cracks may develop and spread at an interface between the diffusion layer and the alloy layer failing to overcome deformation, and a problem of being delaminated to have a fine powder form occurs.

The hot dip aluminum plating layer forming the hot press formed (HPF) article of the present invention is formed such that the diffusion layer and the alloy layer have a difference in hardnesses of 400 (Hv) or less. When a difference in hardnesses between the diffusion layer and the alloy layer is greater than 400, deformation is not absorbed during the high temperature processing, and delamination at an interface between the diffusion layer and the alloy layer occurs.

As a means of achieving the above, a method of including components such as Si, Mn, Ti and W steel components in the alloy layer in very small amounts may be used in the present invention, and when components such as above are included in a crystal lattice of an intermetallic compound, the compound may be crystalline and hardness may be decreased. Generally, when a specific element is included in a metal element, hardness increases due to crystal lattice distortion, however, the intermetallic compound base itself has strong bonding and high hardness, and hardness may be significantly decreased when including a specific element.

As another means, surface tempering is carried out on the hot dip aluminum plated steel sheet by 0.5% to 3% prior to high temperature processing so as to facilitate alloy phase formation during high temperature heating and to facilitate the introduction of specific elements into the alloy phase.

In addition, the inventors of the present invention have paid attention to a tau phase inside the alloy layer, a hard layer, and have identified that shapes and distribution of a tau phase have an influence on a lamination resistance properties, and delamination resistance is improved when a tau phase is irregularly and discontinuously dispersed and distributed in an amount of 10% or greater based on the total area fraction of the alloy layer. In other words, delamination ultimately occurs between the diffusion layer and the alloy layer, and when external force is applied causing the development and spread of cracks from the surface, the tau phase in the alloy layer first absorbs some of the external force. Herein, the tau phase being dispersed into the alloy layer is advantageous for stress dispersion, and therefore, dispersion needs to be irregular and discontinuous.

The tau phase needs to be 10% or greater based on the area fraction of the whole alloy layer to exhibit an improvement effect, and when less than 10%, a stress dispersion effect may be insignificant. Preferably, the tau phase area fraction in the alloy layer is managed to be within a 10% to 20% range.

In addition, the tau phase has a shape advantageous for stress dispersion, and closer to a circular shape is more advantageous. Considering the above, the present invention preferably controls the tau phase aspect ratio to 1 to 4, and accordingly, delamination resistance may be more improved. More preferably, the aspect ratio is managed to be in a range of 1 to 2.

In addition, a tau phase having a smaller size is more advantageous for stress dispersion. The tau phase is distributed in the alloy layer in various sizes, and in the present invention, having a tau phase with a size of 5 μm or less in 50% or greater with respect to the total tau phase fraction is preferable, and more excellent delamination resistance may be provided thereby.

Next, a method for manufacturing a hot press formed (HPF) article having excellent delamination resistance will be described.

The method for preparing a hot press formed (HPF) article of the present invention includes preparing a steel sheet having steel components as above; hot dip aluminum plating the steel sheet by, after heating the steel sheet to a temperature of 550° C. to 850° C., immersing the steel sheet in a hot dip aluminum plating bath maintained at a temperature of 640° C. to 680° C. and composed of, in % by weight, Si: 7% to 13%, Fe: less than 3%, and the remainder of Al and other unavoidable impurities; skin pass milling (SPM) the hot dip galvanized steel sheet with an elongation of 0.5% to 3% after cooling the hot dip galvanized steel sheet; alloying a hot dip aluminum plating layer on a surface of the hot dip aluminum plated steel sheet by heating the hot dip aluminum plated steel sheet to a temperature of 850° C. to 950° C. and maintaining the temperature for a certain period of time; and preparing a hot press formed (HPF) product by rapidly cooling the alloyed hot dip aluminum plated steel sheet to a temperature of 300° C. or lower while hot press forming the alloyed hot dip aluminum plated steel sheet.

First, in the present invention, a steel sheet having components as described above is prepared. The steel sheet in the present invention may be a hot rolled steel sheet or a cold rolled steel sheet.

Next, in the present invention, the steel sheet is heated to a temperature of 550° C. to 850° C., and then hot dip aluminum plated by being immersed in a hot dip aluminum plating bath maintained at a temperature of 640° C. to 680° C. and composed of, in % by weight, Si: 7% to 13%, Fe: less than 3%, and the remainder of Al and other unavoidable impurities.

First, the steel sheet is heated to a temperature of 550° C. to 850° C. in an annealing furnace. The goal of annealing the steel sheet is to readily process a steel sheet that has become hard from cold rolling, and is not to secure final physical properties. When the annealing temperature is lower than 550° C., processing is difficult with a hardened structure, which may cause changes in sizes when a cutting process or a forming process is carried out. On the other hand, the annealing temperature being higher than 850° C. is not suitable since heating facility degradation and waste of heat energy occur.

Then the heated steel sheet is hot dip aluminum plated by being immersed in a hot dip aluminum plating bath, and herein, the temperature of the plating bath is preferably in a range of 640° C. to 680° C. The temperature of the plating bath is determined considering phase transformation of the hot dip aluminum, and it is preferable to maintain a molten state when plating and rapidly phase transform a plating layer to a coagulated state after hot dipping. When the temperature of the hot dip aluminum plating bath is less than 640° C., the aluminum plating bath is locally coagulated in a pot causing early coagulation of an aluminum plating layer plated on the steel sheet, and plating qualities may be poor. On the other hand, the temperature of the plating bath being greater than 680° C. is not suitable since the plating bath may be quickly eroded.

Meanwhile, in the present invention, the hot dip aluminum plating bath may have a composition of 7% by weight to 13% by weight of Si, less than 3% by weight of Fe, and the remainder of aluminum and other impurities. When adding Si to the hot dip aluminum plating bath, Si participates in a reaction between iron and aluminum, and a Fe—Al—Si-based alloy layer is produced between the substrate steel sheet and the plating layer. A Fe—Al—Si alloy layer is known to suppress excessive production of a Fe—Al-based alloy layer.

A diffusion reaction is involved when high temperature heat treating the aluminum plated steel sheet in a high temperature forming process, and therefore, Si among the plating bath components affects a structure and distribution of the alloy plating layer (alloy layer) after the high temperature forming. In other words, when the Si content is lower than 7% by weight in an aluminum plating bath, plating layer formation is heterogeneous, and tau phase formation inside the alloy layer may be insufficient during the high temperature heat treatment as well. On the other hand, when the Si content is greater than 13% by weight, the plating bath has a higher melting point and an alloy layer formation reaction is delayed in high temperature heat treatment, and a tau phase having target fractions, shapes and distribution may not be obtained.

The hot dip aluminum plating bath includes Fe in an amount less than 3% by weight, and this is dissolved and comes from the substrate steel sheet and is in equilibrium within a solubility limit of iron in the aluminum. However, when Fe is included in a plating bath solution in an amount of 3% by weight or greater, dross is formed in the plating bath and adheres on a surface of the plated steel sheet, which lowers surface plating qualities.

In addition, a thickness of the plating layer obtained from the hot dip aluminum plating is preferably managed to be within a range of 20 µm to 40 µm in the present invention.

A thickness of the plating layer may be part of an order or a request made by a customer and is not a controlling factor; however, a plating thickness affects alloy plating layer formation in high temperature forming. When the plating layer has a thickness of less than 20 µm, the alloy plating layer may be relatively thin after high temperature forming, and an article may not be sufficiently protected from corrosion, and when a plating thickness is greater than 40 µm, defects such as a flow pattern frequently occur when plating, and the alloy plating layer is thickly formed in high temperature forming, which may cause a problem of facilitating delamination of the alloy plating layer.

In the present invention, the hot dip galvanized steel sheet is skin pass milled (SPM) with an elongation of 0.5% to 3% after cooling the hot dip galvanized steel sheet. In other words, the plated steel sheet that is aluminum plated by passing through the hot dip aluminum plating bath goes through an air knife controlling a coating amount of plating and a cooling process coagulating the hot dip aluminum plating layer. Subsequently, skin pass milling (hereinafter, SPM) continuously providing a surface function is carried out with an elongation of 0.5% to 3%.

A main goal of the skin pass milling is to remove yield point elongation, correct a shape, or provide surface roughness. However, based on the research results, the inventors of the present invention have identified that, when forming an alloy plating layer during high temperature heat treatment, a tau phase may be irregularly dispersed and distributed inside the alloy plating layer by providing deformation to the plating layer through controlling skin pass elongation and rolling force. However, when the elongation is less than 0.5%, deformation of the plating layer is low, and an effect of dispersion and distribution of the tau phase on the alloy plating layer may not be obtained, and the elongation greater than 3% is not desirable, since a part of the plating layer may be destroyed due to excessive elongation, and coated on the skin pass roll causing dents and the like. Skin pass rolling force is a dependent variable of elongation, and is normally within a range of 100 tons to 250 tons.

Subsequently, by heating the hot dip aluminum plated steel sheet to a temperature between 850° C. to 950° C., and maintaining the sheet at the temperature for a certain period of time, a hot dip aluminum plating layer on the surface is alloyed.

In other words, the aluminum plated steel sheet is inserted into a heating furnace having an atmospheric temperature in a range of 850° C. to 950° C. and heat treated at a temperature in a range of 850° C. to 950° C. The atmospheric temperature of the heating furnace may not be the same as the temperature of the inserted steel sheet, and a core factor is the temperature of the steel sheet. However, controlling the atmospheric temperature is more convenient than directly controlling the temperature of the steel sheet. When the temperature of the steel sheet is less than 850° C., austenite homogenization of the steel structure may be insufficient. On the other hand, a temperature of the steel sheet greater than 950° C. is advantageous for heating the plated steel sheet, but has a problem such as a waste of energy, and degradation of heating furnace facilities.

The hot dip aluminum plating layer formed on the surface of the steel sheet is alloyed from high temperature heat treatment as described above. In other words, a hot dip aluminum plating layer formed with a soft diffusion layer and a hard alloy layer may be obtained, and the alloy layer may be formed to include a $Fe_2Al_5$ matrix phase having brittleness and a tau phase (Fe—Al—Si-based alloy phase) having soft properties.

In addition, the tau phases may be irregularly and discontinuously dispersed and distributed inside the alloy layer in an amount of 10% or greater, based on the total area fraction, and accordingly, a difference in hardnesses between the alloy layer and the soft layer may be controlled to 400 or less. More preferably, the tau phase is present in a range of 10% by area to 20% by area inside the alloy layer.

In addition, the tau phase preferably has an aspect ratio in a range of 1 to 4.

Moreover, the tau phase having a size of 5 µm or less preferably occupies an area of 50% or greater with respect to the total tau phase fraction.

Meanwhile, in the present invention, total heating time is preferably within 30 minutes in the heat treatment. When the total heating time is a maximum of 30 minutes in the above-mentioned temperature range, austenite structure homogenization is saturated, and when total heating time is longer than 30 minutes, a problem of a reduction in productivity may occur.

In addition, time taken for the heated steel sheet to be transported from a furnace to a mold is preferably within 20 seconds. When the transport time is longer than seconds, the steel sheet temperature decreases to a ferrite transformation initiation temperature or lower, and target strength may not be obtained. Preferably, the transport time is within 12 seconds.

Subsequently, in the present invention, a hot press formed (HPF) product is manufactured by rapidly cooling the alloyed hot dip aluminum plated steel sheet to a temperature of 300° C. or lower while hot press forming the alloyed hot dip aluminum plated steel sheet. In other words, the alloyed steel sheet is formed with a hot press mold of which inside is water-cooled, and the HPF processing is finished by removing the processed article from the mold after the temperature of the steel sheet is 300° C. or lower. Removing the formed article from the mold at a steel sheet temperature of 300° C. or higher after the hot dip press may cause deformation due to thermal stress.

Hereinafter, the present disclosure will be described more specifically according to examples. However, the following examples are for illustrative purposes only, and should not be seen as limiting the scope of the present disclosure. The scope of the present disclosure should be determined by the claims and information reasonably inferable therefrom.

EXAMPLES

After preparing a cold rolled steel sheet having a thickness of 1.5 mm formed with, in % by weight, C: 0.22%, Si: 0.25%, Mn: 1.18%, P: 0.014%, S: 0.0022%, Al: 0.033%, Cr: 0.181%, Ti: 0.034%, B: 0.0023%, N: 0.0050%, and a remainder of Fe and other impurities, the cold rolled steel sheet was cut into fragments having a size of 120 mm×200 mm to prepare specimens. Then, the prepared samples were degreased with kerosene and ultrasonic acetone to remove surface rolling oil and contaminants. Thereafter, the prepared samples were heated to a temperature of 780° C. for a total heating time of 6 minutes, and then plated by being immersed in a hot dip aluminum plating bath at a temperature of 660° C., and herein, the coating amount of the plating layer was controlled to be 20 μm to 40 μm. Moreover, the hot dip aluminum plating bath composition herein was formed to have 0% by weight to 13% by weight of Si, and a remainder of aluminum, Fe being inevitably eluted from the steel sheet, and other impurities, and skin pass elongation was controlled to be within a range of 0% to 3%. The following Table 1 lists specific hot dip aluminum plating conditions for the plated steel sheet specimens used in the tests.

TABLE 1

| Plated Steel Sheet No. | Heating Temperature (° C.) | Plating Bath Temperature (° C.) | Plating Bath Si Amount (%) | Plating Thickness (μm) | Skin Pass Elongation (%) |
|---|---|---|---|---|---|
| 1 | 780 | 660 | 13 | 30 | 0.5 |
| 2 | 780 | 660 | 9 | 35 | 3 |
| 3 | 780 | 660 | 9 | 30 | 1.2 |
| 4 | 780 | 660 | 7 | 40 | 0.5 |
| 5 | 780 | 660 | 3 | 25 | 3 |
| 6 | 780 | 660 | 0 | 30 | 0 |
| 7 | 780 | 660 | 9 | 30 | 10 |
| 8 | 780 | 660 | 9 | 30 | 0 |

When the hot dip aluminum plating was carried out as in Table 1, the plated steel sheets 1 to 4 exhibited favorable plating qualities; however, in the plated steel sheets 5 to 8, problems such as dross adherence after the hot dipping occurred. Particularly, the plated steel sheet 7 had poor plating surface quality due to excessive plating layer deformation.

Thereafter, plated steel sheets 1 to 6 and 8 were heat treated at an atmospheric temperature of 930° C. for a total holding time of 6 seconds. Then area fractions of components forming an alloy plating layer formed by the heat treatment were measured, and specifically, area fractions of a diffusion layer, $Fe_2Al_5$ and a tau phase forming the alloy plating layer are shown in the following Table 2. As shown in the following Table 2, it was seen that Examples 1 to 4 prepared under the manufacturing process conditions of the present invention all had the tau phase area ratio of 10% or greater in the alloy plating layer. However, Comparative Examples 1 to 3 having the manufacturing process condition outside the scope of the present invention all had the tau phase area fraction of less than 10%.

TABLE 2

| Plated Steel Sheet No. | High Temperature Forming Heat Treatment | | Alloy Plating Layer Forming Area Ratio (%) | | | Note |
|---|---|---|---|---|---|---|
| | Atmospheric Temperature (° C.) | Total Holding Time (s) | Diffusion Layer | $Fe_2Al_5$ | Tau phase | |
| 1 | 930 | 6 | 16 | 61 | 23 | Invention Example 1 |
| 2 | 930 | 6 | 20 | 59 | 21 | Invention Example 2 |
| 3 | 930 | 6 | 18 | 67 | 15 | Invention Example 3 |
| 4 | 930 | 6 | 27 | 63 | 10 | Invention Example 4 |
| 5 | 930 | 6 | 33 | 59 | 8 | Comparative Example 1 |
| 6 | 930 | 6 | 74 | 26 | 0 | Comparative Example 2 |
| 8 | 930 | 6 | 28 | 63 | 9 | Comparative Example 3 |

Meanwhile, a longitudinal section of the plated steel sheet heat treated as above was observed and analyzed, and the results are shown in the following Table 3. Herein, hardness is a Vicker's (Hv,1 g) hardness value measured using a micro hardness tester under a 1 g load condition, and a difference in hardnesses was calculated and listed after each measured hardness of the diffusion layer and hardness of the alloy layer. The tau phase area ratio in the alloy layer was calculated as an area fraction using an image analyzer, and an area ratio of the tau phase having an average diameter of 5 μm or less, and an aspect ratio of the tau phase were also measured. The results are shown in the following Table 3.

In addition, delamination resistance evaluation on the alloy layer in the following Table 3 was carried out such that an internal angle was formed to be 30 degrees using a 3 point bending tester, tape was attached to the inside and then removed, and a state of delamination smearing on the tape was evaluated. Specifically, the following evaluation criteria were used.

[Model Example of Delamination Resistance Evaluation]
  ○: No delamination occurred and delaminated pieces were not present on the tape.
  X: Delamination occurred and delaminated pieces were present on the tape.

TABLE 3

| Plated Steel Sheet No | Difference in hardnesses (Hv) between Diffusion Layer and Alloy Layer | Tau phase in Alloy Layer (%) | Area Ratio of Tau phase with 5 μm or Less (%) | Aspect Ratio of Tau phase | Alloy Layer Delamination Resistance | Note |
|---|---|---|---|---|---|---|
| 1 | 384 | 23 | 82 | 3.3 | ○ | Invention Example 1 |
| 2 | 395 | 21 | 73 | 2.4 | ○ | Invention Example 2 |
| 3 | 384 | 15 | 62 | 2.8 | ○ | Invention Example 3 |
| 4 | 350 | 10 | 61 | 2.1 | ○ | Invention Example 4 |

TABLE 3-continued

| Plated Steel Sheet No | Difference in hardnesses (Hv) between Diffusion Layer and Alloy Layer | Tau phase in Alloy Layer (%) | Area Ratio of Tau phase with 5 μm or Less (%) | Aspect Ratio of Tau phase | Alloy Layer Delamination Resistance | Note |
|---|---|---|---|---|---|---|
| 5 | 583 | 8 | 55 | 2.8 | X | Comparative Example 1 |
| 6 | 552 | 0 | 0 | 0 | X | Comparative Example 2 |
| 8 | 485 | 9 | 16 | 7.4 | X | Comparative Example 3 |

As shown in Table 3, it was seen that Invention Examples 1 to 4 all had the tau phase area fraction of 10% or greater in the alloy layer, and in addition to this, the area surface of the tau phase having an average diameter of 5 μm or less and the aspect ratio of the tau phase satisfied the scope of the present invention. Accordingly, it was seen that a difference in hardnesses between the alloy layer and the diffusion layer became 400 (Hv) or less.

Figure 1:
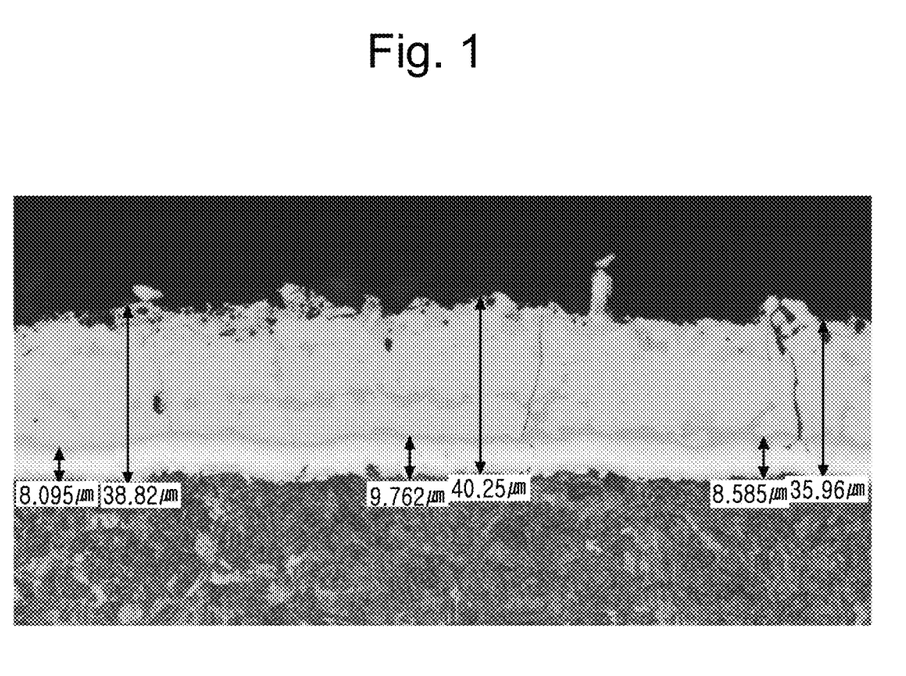
FIG. 1 is a view of a longitudinal section illustrating a plating layer of a plated steel sheet according to an embodiment of the present invention.
Figure 2:
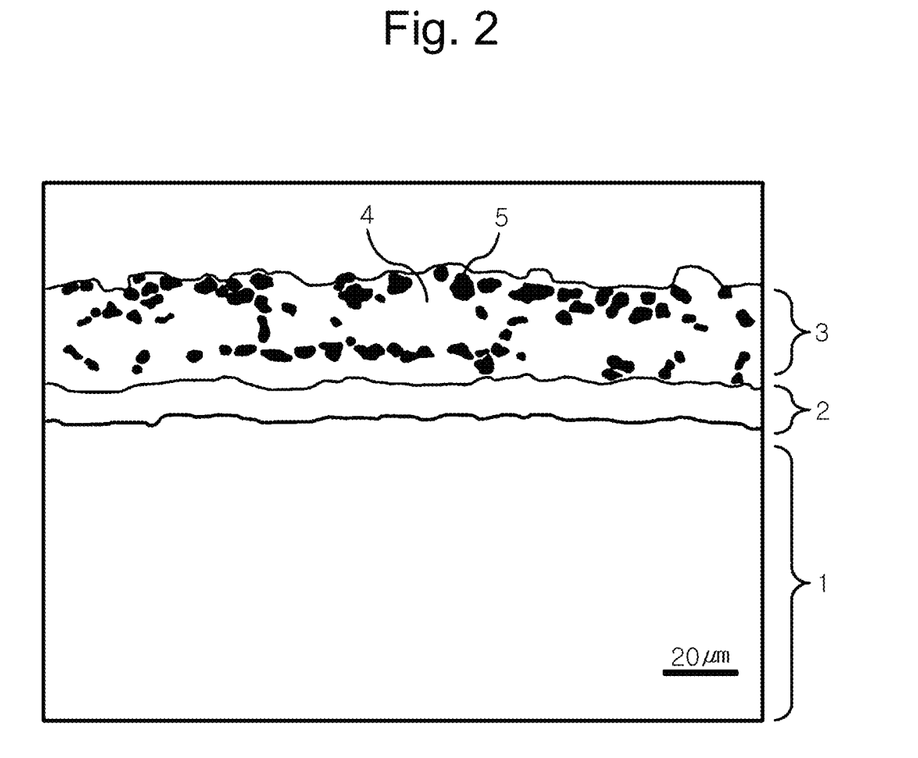
FIG. 2 is a drawing illustrating the structural picture of FIG. 1.

Meanwhile, FIG. 1 is a structural picture of a longitudinal section showing the plating layer of the plated steel sheet 3 of Invention Example 3, and FIG. 2 is a diagram of the structural picture of FIG. 1. As shown in FIGS. 1 and 2, the tau phases (5) forming the alloy layer are irregularly and discontinuously formed inside the plating layer in the present invention. Having such tau phase distribution enables effective accomplishment of the above-described difference in hardnesses of 400 (Hv) or less between the alloy layer and the diffusion layer.

In FIG. 2, reference numeral 1 represents a substrate steel sheet, 2 represents a diffusion layer, 3 represents an alloy layer, 4 represents $Fe_2Al_5$ and 5 represents a tau phase particle, and an alloy plating layer is formed combining the diffusion layer (2) and the alloy layer (3).

Meanwhile, it was seen that Comparative Examples 1 to 3 having the manufacturing process outside the scope of the present invention all had a difference in hardnesses of greater than 400 (Hv) between the alloy layer and the diffusion layer, and accordingly, it was identified through Table 3 that delamination resistance was also degraded.

Hereinbefore, the present invention has been described with reference to the examples, however, it is to be understood that those skilled in the art is capable of diversely modify and change the present invention within the scope ideas and areas of the present invention described in the following claims.

What is claimed are:

1. A hot press formed (HPF) article having excellent delamination resistance, a hot dip aluminum plating layer being formed on a surface of a substrate steel sheet, wherein the substrate steel sheet includes, in % by weight, C: 0.18% to 0.25%, Si: 0.1% to 1.0%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005, N: 0.009% or less, and a remainder of Fe and other impurities;

the plating layer is formed to have a soft diffusion layer and a hard alloy layer;

the alloy layer comprises $Fe_2Al_5$ matrix phase and a tau phase comprised of Fe—Al—Si based alloy phase;

the tau phase is irregularly and discontinuously dispersed and distributed inside the alloy layer in an amount of 10% or greater based on the total area fraction so that a difference in hardnesses between the alloy layer and the diffusion layer is 400 (Hv) or less.

2. The hot press formed (HPF) article having excellent delamination resistance of claim 1, wherein the substrate steel sheet is a cold rolled steel sheet or a hot rolled steel sheet.

3. The hot press formed (HPF) article having excellent delamination resistance of claim 1, wherein the tau phase is present in a range of 10% by weight to 20% by weight inside the alloy layer.

4. The hot press formed (HPF) article having excellent delamination resistance of claim 1, wherein the tau phase has an aspect ratio in a range of 1 to 4.

5. The hot press formed (HPF) article having excellent delamination resistance of claim 1, wherein the tau phase having a size of 5 μm or less occupies an area of 50% or greater with respect to the total tau phase fraction.

6. The hot press formed (HPF) article having excellent delamination resistance of claim 1, wherein the substrate steel sheet further includes Mo+W in an amount of 0.001% to 0.5%.

7. The hot press formed (HPF) article having excellent delamination resistance of claim 1, wherein the substrate steel sheet further includes a sum of one or more types of Nb, Zr or V in a range of 0.001% to 0.4%.

8. The hot press formed (HPF) article having excellent delamination resistance of claim 1, wherein the substrate steel sheet further includes Cu+Ni in a range of 0.005% to 2.0%.

9. The hot press formed (HPF) article having excellent delamination resistance of claim 1, wherein the substrate steel sheet further includes one or more types of Sb, Sn or Bi in an amount of 0.03% or less.

10. A method for manufacturing a hot press formed (HPF) article having excellent delamination resistance, the method comprising:

preparing a steel sheet including, in % by weight, C: 0.18% to 0.25%, Si: 0.1% to 1.0%, Mn: 0.9% to 1.5%, P: 0.03% or less, S: 0.01% or less, Al: 0.01% to 0.05%, Cr: 0.05% to 0.5%, Ti: 0.01% to 0.05%, B: 0.001% to 0.005, N: 0.009% or less, and a remainder of Fe and other impurities;

hot dip aluminum plating the steel sheet by, after heating the steel sheet to a temperature of 550° C. to 850° C., immersing the steel sheet in a hot dip aluminum plating bath maintained at a temperature of 640° C. to 680° C. and composed of, in % by weight, Si: 7% to 13%, Fe: less than 3%, and the remainder of Al and other unavoidable impurities;

skin pass milling (SPM) the hot dip aluminum plating steel sheet with an elongation of 0.5% to 3% after cooling the hot dip galvanized steel sheet;

alloying a hot dip aluminum plating layer on a surface of the hot dip aluminum plated steel sheet by heating the hot dip aluminum plated steel sheet to a temperature of 850° C. to 950° C. and maintaining the temperature for a certain period of time; and manufacturing a hot press formed (HPF) product by rapidly cooling the alloyed hot dip aluminum plated steel sheet to a temperature of 300° C. or lower while hot press forming the alloyed hot dip aluminum plated steel sheet.

11. The method for manufacturing a hot press formed (HPF) article having excellent delamination resistance of claim 10, wherein the alloyed hot dip aluminum plating layer is formed to have a soft diffusion layer and a hard alloy layer;

the alloy layer comprises $Fe_2Al_5$ matrix phase and a tau phase comprised of Fe—Al—Si based alloy phase;

a tau phases is irregularly and discontinuously dispersed and distributed inside the alloy layer in an amount of 10% or greater based on the total area fraction.

12. The method for manufacturing a hot press formed (HPF) article having excellent delamination resistance of claim 11, wherein the tau phase is present in a range of 10% by area to 20% by area inside the alloy layer.

13. The method for manufacturing a hot press formed (HPF) article having excellent delamination resistance of claim 11, wherein the tau phase has an aspect ratio in a range of 1 to 4.

14. The method for manufacturing a hot press formed (HPF) article having excellent delamination resistance of claim 11, wherein the tau phase having a size of 5 µm or less occupies an area of 50% or greater with respect to the total tau phase fraction.

15. The method for manufacturing a hot press formed (HPF) article having excellent delamination resistance of claim 10, wherein the steel sheet is a cold rolled steel sheet or a hot rolled steel sheet.

16. The method for manufacturing a hot press formed (HPF) article having excellent delamination resistance of claim 10, wherein the substrate steel sheet further includes Mo+W in an amount of 0.001% to 0.5%.

17. The method for manufacturing a hot press formed (HPF) article having excellent delamination resistance of claim 10, wherein the substrate steel sheet further includes a sum of one or more types of Nb, Zr or V in a range of 0.001% to 0.4%.

18. The method for manufacturing a hot press formed (HPF) article having excellent delamination resistance of claim 10, wherein the substrate steel sheet further includes Cu+Ni in a range of 0.005% to 2.0%.

19. The method for manufacturing a hot press formed (HPF) article having excellent delamination resistance of claim 10, wherein the substrate steel sheet further includes one or more types of Sb, Sn or Bi in an amount of 0.03% or less.

* * * * *